United States Patent Office 3,324,315
Patented June 6, 1967

3,324,315
ELECTROSTATIC GENERATING UNIT
Roger Claudius Marius Morel, Grenoble, Isere, France, assignor to SAMES, Societe Anonyme de Machines Electrostatiques, Paris, France, a French joint-stock company
Filed Mar. 30, 1964, Ser. No. 355,887
Claims priority, application France, Mar. 28, 1963, 929,622, Patent 1,361,961
16 Claims. (Cl. 310—6)

This invention relates to generating apparatus and more particularly to a self-contained generator unit of the electrostatic type.

Although the basic principles of electrostatic machinery have been known for a great many years, it has been only comparatively recently that they have gained general acceptance in fields of industry and commerce. The dramatic entry of such machinery into the electrical engineering market has resulted in part because of the development of an improved form of electrostatic generator. Generators of this type customarily include a rotor or other conveying member for the electrostatic charges, a stator in spaced relationship with the rotor, input ionizer an dinductor electrodes associated with the rotor and stator for charging the rotor upon the application of an exciting voltage across the input electrodes, and output ionizer and inductor electrodes for withdrawing charges from the rotor. For a more detailed discussion of representative electrostatic generators of this type, reference may be had to the article by Noël Felici in "L'Onde Electrique," No. 358, January 1957, pages 7–27.

In electrostatic generators of the foregoing type, difficulties have been encountered in supplying the requisite exciting voltage across the input electrodes, and these difficulties have been of special moment in cases in which it is desired to provide maximum output power and voltage per unit volume.

Furthermore, the output voltage produced by such prior generators often exhibited a tendency to fluctuate from its design value, and the operation of the generator was otherwise inefficient in several respects.

One general object of this invention, therefore, is to provide a new and improved generating unit of the electrostatic type.

More specifically, it is among the objects of the present invention to provide an improved construction of electrostatic generator assembly in the form of a self-contained, autonomous unit containing within it not only the generator apparatus proper but also the exciting source, and in some cases voltage regulating means as well. A self-contained unit of this kind is of great practical value, particularly in cases where the generator is operated by unskilled hands. Not only is the sealed, completely enclosed unit compact, rugged and safe, but its external connections are reduced to a minimum, and its operation is virtually foolproof.

Many types of electrostatic generators require a D.C. exciting voltage across the input electrodes which is comparatively high and illustratively is of the order of a few tens of kilovolts. The output voltage produced by the generator may attain many hundreds and into the thousands of kilovolts. The need for a relatively high input voltage heretofore presented problems which adversely affected the self-contained character of the unit, sought by the invention. A specific object of the invention is to solve this problem in a simple and efficient manner.

For this purpose, according to an important feature of several advantageous embodiments of the invention, there is used as the excitation source a small auxiliary electrostatic generator having self-exciting characteristics. The auxiliary generator is mounted within the sealed container of the unit and is driven with the rotor of the main generator.

With the use of such a self-exciting or self-priming auxiliary generator as the excitation source, the only input connection into the sealed container of the unit is the power input connection for driving the rotors of the main and auxiliary generators. In some arrangements, this power input conveniently comprises a drive shaft sealingly extending through a wall of the container. In other embodiments, the power input includes a low-voltage conductor which energizes an electric motor mounted within the sealed unit. By avoiding high voltage input connections to the unit, the safety features of the generator are further enhanced.

In accordance with several embodiments of the invention, the housing for the generating unit is hermetically sealed and is provided with a body of gas under pressure having a relatively high dielectric strength. The gas enables the realization of a substantial increase in the field strength for both the main generator and the auxiliary generator without obtaining breakdown values, with the result that the operating efficiency of the unit is further enhanced.

According to a preferred embodiment of the invention, the sealed unit also contains within it an electrostatic regulator device for stabilizing the output voltage of the main generator. This device profits from the high electrostatic properties of the dielectric pressure gas in the container and enhances the over-all efficiency factor of the system. In addition, the regulator contributes toward the self-contained character of the unit.

One illustrative field of application where the improved generator unit of the invention is of especial value is the electrostatic treatment of agricultural crops. Electrostatic generators are now widely used in the spraying and sprinkling of crops with finely divided treating agents, such as pesticides, for example, by a process involving the creation of a strong electrostatic field between the sprayer nozzles and the crops. This field guides the particles of treating agent toward the plant surfaces along lines of force and then bonds the particles to the surfaces through electrostatic attraction.

It is hence a specific object of this invention to provide a self-contained high-voltage generator unit which is easily and quickly mountable on a vehicle such as a farming tractor by unskilled personnel and which operates efficiently, reliably and safely without requiring regulating adjustments or other frequent maintenance.

Exemplary embodiments of the invention will now be described, for purposes of illustration but not of limitation, with reference to the accompanying drawings, wherein.

Figure 1:
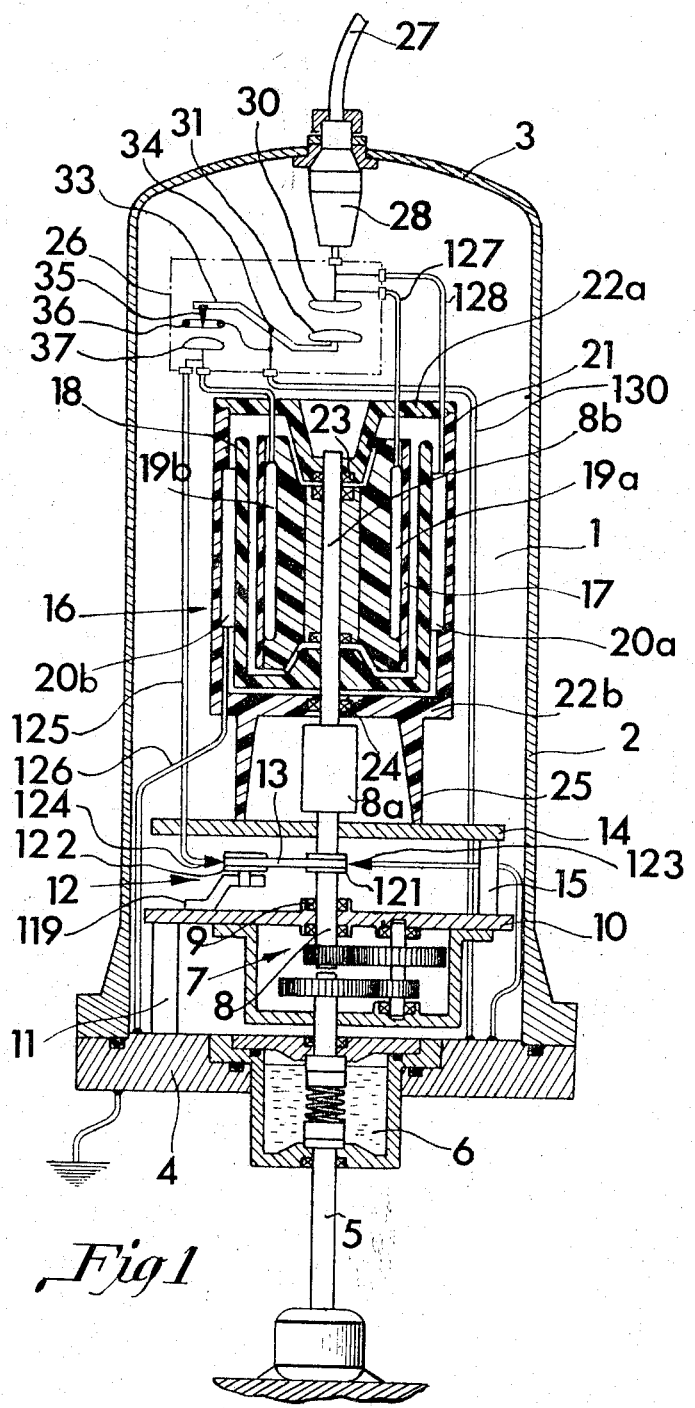
FIGURE 1 is a partly schematic view, primarily in vertical axial section, of a first embodiment of an improved self-contained generator unit in accordance with the invention.

Referring to FIGURE 1, a sealed chamber or enclosure 1 is defined within a hermetically sealed housing or container 2 having a generally cylindrical main wall and a domed top 3. The open bottom end of the container 2 has a rigid base member 4 assembled to it. The chamber 1 is filled with gas under pressure having high dielectric rigidity, illustratively hydrogen under a pressure of about fifteen to twenty atmospheres. In a central aperture of the base plate 4, there is positioned a packing box and gland assembly generally designated 6, through which a rotatable input shaft 5 extends into the housing 1.

The inner end of the drive shaft 5 is connected to a speed multiplier gearing unit indicated generally at 7. The unit 7 is disposed within a housing secured to the lower surface of a plate 10 which is supported above the base plate 4 by uprights 11. A shaft 8 is coaxially aligned with the shaft 5 and serves as the output shaft for the unit 7. The shaft 8 is rotatably carried in bearings 9 supported in a central aperture in the plate 10. The arrangement is such that the speed of the shaft 8 is a predetermined multiple of the speed of the input shaft 5.

Supported above the plate 10 by means of uprights 15 is a circular upper plate 14 having a central opening which accommodates the shaft 8. The generally cylindrical casing 21 of a main electrostatic generator 16 is mounted above the plate 14 and is spaced therefrom by uprights 25. The generator 16 includes an inner stator 17 of annular cross-section fixedly secured within the casing 21 and a cylindrical generally cup-shaped rotor 18 externally disposed with respect to the stator. The stator 17 is of suitable semi-conductive material, while the rotor 18 is non-conductive. The bottom wall of the rotor 18 is keyed or otherwise rigidly affixed to an axially extending shaft 8b which is coaxially aligned with the shaft 8 and is connected thereto by a coupling 8a. The shaft 8b is journaled in spaced bearings 23 and 24 which are respectively positioned in the top wall 22a and the bottom wall 22b of the casing 21.

The outer surface of the stator 17 is spaced from the inner wall of the rotor 18 to define an annular gap of uniform width. This gap, together with all of the space within the generator casing 21, is filled with the pressurized gas.

The main electrostatic generator 16 includes a pair of inductor electrodes 19a and 19b which are fixedly supported in the cylindrical stator 17 in engagement with diametrically opposed generatrices thereof. A pair of ionizer electrodes 20a and 20b are mounted on the inner wall of the generator casing 21 in diametrically opposed positions and in alignment with the inductor electrodes 19a and 19b. The inductor electrodes 19a and 19b are in the form of elongated metal strips of arcuate cross-section (see FIGURE 2), while the ionizer electrodes 20a and 20b are thin metallic strips longitudinally inserted in grooves in the inner surface of the casing 21 with their exposed longitudinal edges closely spaced from generatrices of the revolving outer surface of the rotor 18.

The inductor and ionizer electrodes 19b and 20b constitute the input or exciter electrodes of the generator 16, while the opposite pair of inductor and ionizer electrodes 19a and 20a constitute the output electrodes.

The input inductor and ionizer electrodes 19b and 20b have a D.C. exciting voltage applied thereacross from an electrostatic generator generally designated at 12. Although a wide variety of electrostatic generators may be used to supply the exciting voltage, in several advantageous embodiments the generator 12 is of the self-exciting type disclosed, for example, in copending application Ser. No. 296,058 filed July 18, 1963, by Elie Gartner, now Patent 3,256,450. The generator 12 includes a small drive pulley 121 secured on the main drive shaft 8 and a driven pulley 122 mounted for rotation on a bracket 119 carried by the lower supporting plate 10. The pulleys 121 and 122 are coupled by means of a belt 13 of rubber or other insulating material. A first ionizing electrode 123 is positioned in spaced, juxtaposed relationship with the outer surface of the belt 13 adjacent the pulley 121, and a second ionizing electrode 124 is similarly placed near the outer belt surface adjacent the pulley 122.

As more fully explained in the copending application referred to above, the generator 12 has self-exciting characteristics. That is, electric charges appear on the pulleys 121 and 122 due to friction against the belt, and the pulleys thus serve as inductors with respect to the respectively related ionizers 123 and 124. The pulley 121 is fabricated from insulating material, while the pulley 122 is electrically conductive. The ionizer 123 is connected to the grounded base plate 4 and deposits electrostatic charges on the belt which are of a polarity opposite that of the charges produced by friction in the pulley 121. The belt carries these charges to the ionizer 124 which is rapidly brought to a potential sufficient to serve as an exciting potential for the main generator 16. Preferably, the auxiliary or exciting generator 12 has means (not shown herein but illustrated, for example, in the aforementioned application) associated therewith for limiting the amount of electric charge on the pulleys.

The output electrode 124 of the exciter generator 12 is connected by an insulated conductor 125 to the input inductor electrode 19b of the main generator 16, and the input ionizer electrode 20b is connected through the base plate 4 to ground by way of a conductor 126.

The output inductor and ionizer electrodes 19a and 19b of the main generator 16 are connected in common by insulated conductors 127 and 128 to an output terminal 27. The terminal 27 protrudes from the casing 2 through an insulator plug 28 inserted through a central opening in the top casing wall 3.

In operation, the input shaft 5 is rotated at a constant speed by a suitable source of mechanical power (not shown). It is contemplated in one typical application of the invention that such source comprise the power take-off of a farming tractor on which the unit is mounted for the purpose of electrostatically spraying agricultural crops. The output shaft 8 of the multiplier gearing 7 imparts simultaneous high-speed rotation to the input pulley 121 of the auxiliary generator 12 and also by way of the coupling 8a and the shaft 8b to the rotor 18 of the main generator 16. Upon the rotation of the pulley 121, a D.C. exciting potential appears at the auxiliary generator output electrode 124 which illustratively is of the order of ten kilovolts. This potential is transmitted along the conductor 125 to the input inductor electrode 19b of the main generator 16.

Because of the voltage difference between the input electrode 19b and the grounded ionizer electrode 20b, the electrode 20b continuously deposits electrostatic charges at the outer surface of the rotor 18. A strong uniform tangential electrostatic field is created in the annular gap between the rotor 18 and the stator 17. The pressurized dielectric gas filling this gap enables the further increase of the filed strength without attaining breakdown values. The charges deposited on the rotor 18 by the input electrode 20b are carried around by the rotor to bring the output ionizer electrode 20a to a high voltage far exceeding the exciting voltage. This output voltage illustratively is several hundred kilovolts and is made availabe on the lead-out conductor 27.

Figure 2:
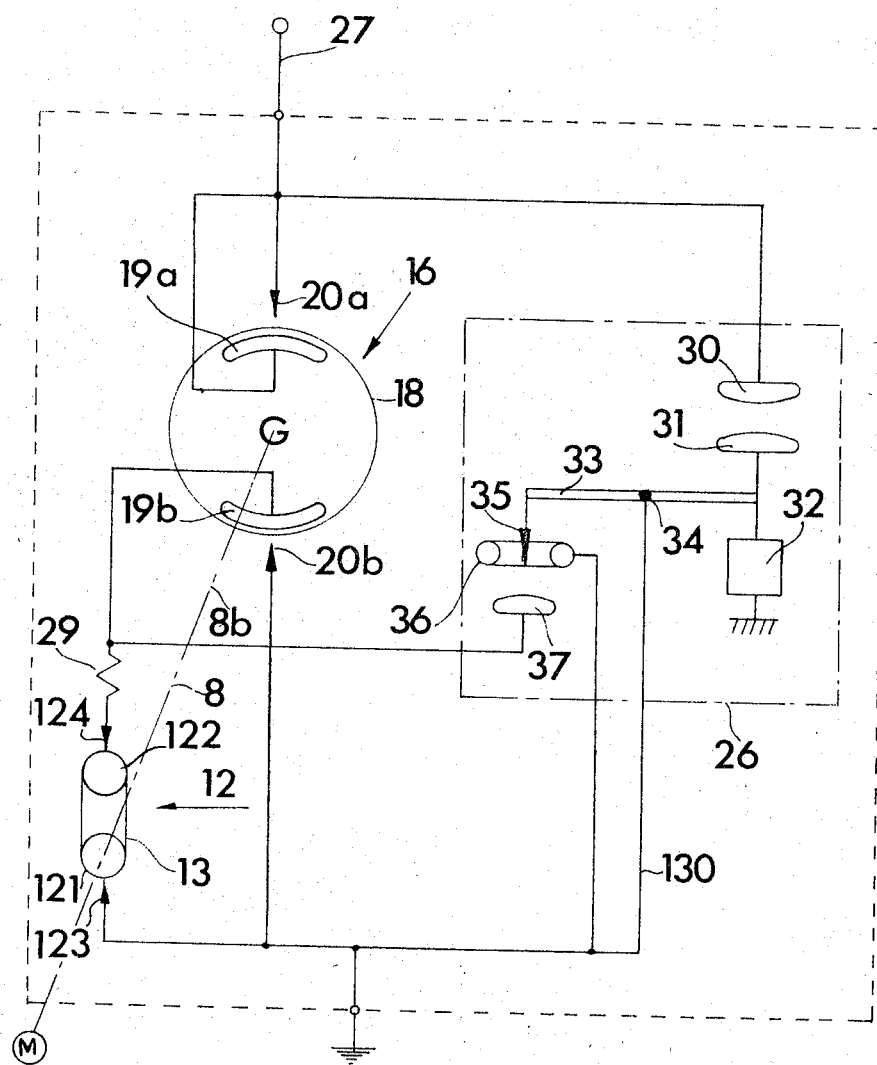
FIGURE 2 is a schematic circuit diagram for the unit of FIGURE 1.

To regulate the output voltage despite variations in rotor drive speed, load, and other factors, there is provided according to a preferred embodiment of the invention an electrostatic regulator 26. The regulator 26 is mounted in a casing, shown schematically in FIGURES 1 and 2 by dot-dash lines, which is supported within the hermetically sealed enclosure 1 atop the main generator casing 21. The regulator includes an electrometer assembly comprising a pair of generally circular facing electrodes 30 and 31. The electrode 30 is stationary and is electrically connected to the output terminal 27 of the generator 16. The electrode 31 is mounted at one end of a two-armed rocking lever 33 which is pivotally supported at 34 and is electrically connected to ground by a conductor 130 leading to the grounded plate 4. The opposite end of lever 33 carries a point electrode 35 which is displaceable axially through a grounded masking ring 36 toward and away from a stationary electrode 37. As best shown in FIGURE 2, this latter electrode is connected to the output terminal of the exciter generator 12 through a resistor schematically indicated at 39 which represents the internal resistance of the generator 12. The electrode 31 is biased away from fixed electrode 30 by a traction spring 32 connected to the lever 33, to similarly bias the point electrode 35 away from the electrode 37.

In the operation of the regulator device, the main generator output voltage appearing across the electrodes 30 and 31 creates an electrostatic attraction force between them so that the movable electrode 31 tends to move toward the electrode 30 against the biasing spring 32. The arrangement is such that as long as the output voltage remains within prescribed limits the position of the point electrode 35 relative to the leakage electrode 37 remains the same, and a small amount of glow or corona discharge takes place to permit the flow of a leakage current from the output electrode 124 of the exciter generator 12 to ground by way of the conductor 125, the electrodes 37, 36 and 35 and the lever arm 33. Should the main generator output voltage increase beyond the prescribed range, the electrode 31 moves toward the electrode 30 to rock the lever 33 counterclockwise. The electrode 35 protrudes further beyond the shielding ring 36 toward the leakage electrode 37 to increase the leakage current and reduce the exciting voltage applied to the inductor electrode 19b of the main generator, thereby reducing the generator output voltage. If the output voltage drops beneath the prescribed range, the effects are reversed. Thus, the leakage current decreases, and a higher exciting voltage is applied to the inductor 19b to increase the generator output.

If desired, one-way regulation may be used. In this latter situation, the biasing force exerted by the spring 32 on the lever 33 is such that, as long as the generator output voltage does not exceed a prescribed maximum, the point electrode 35 is spaced sufficiently far from the electrode 37 that the discharge leakage from electrode 37 through electrode 35 to ground is zero.

Figure 3:
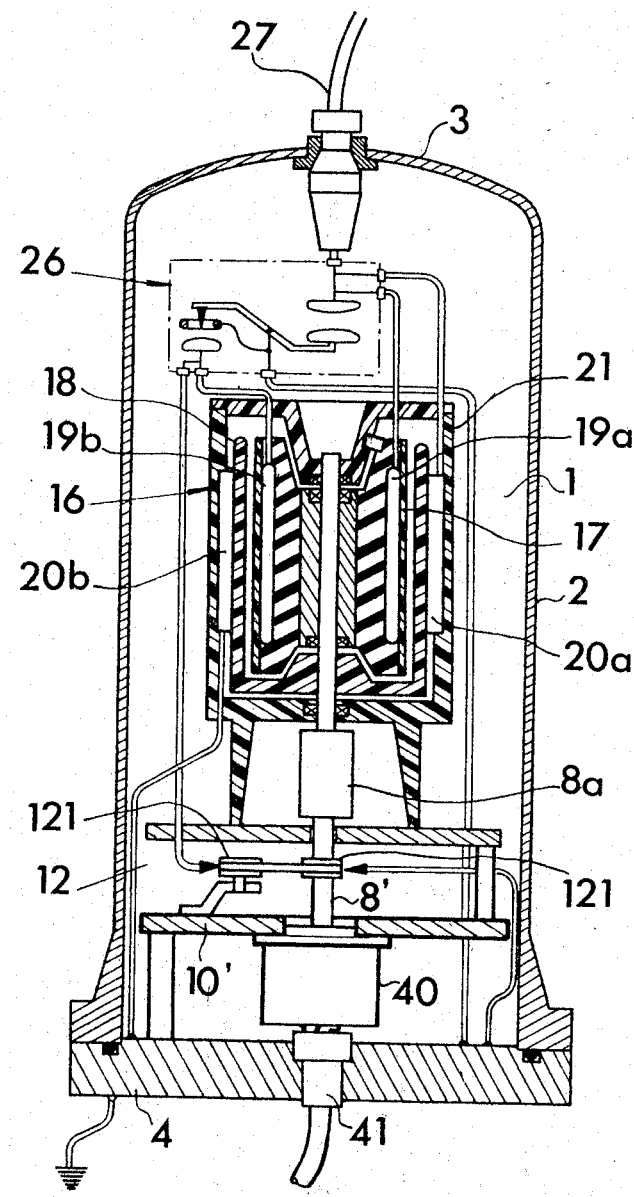
FIGURE 3 is a view in general similar to FIGURE 1 but showing another embodiment in accordance with the invention.

In the modified embodiment shown in FIGURE 3, parts corresponding to parts of the FIGURE 1 embodiment are similarly designated and will not be described anew. In the FIGURE 3 modification, the drive shaft for the apparatus, instead of being driven from a source of mechanical power outside the hermetically sealed container 2, is rotated by an electric motor 40 mounted within the container. The motor 40 is supported from the under side of the lower plate 10' and includes an output shaft 8' which serves as the drive shaft and is connected to the pulley 121 and the spring coupling 8a in a manner similar to that described heretofore in connection with the shaft 8 of FIGURE 1. The energizing leads for the motor 40 extend through an insulating plug 41 in sealing relation with the container 2. This plug is positioned in a central opening in the base plate 4. The shaft 8' drives the rotors 18 and 121 for the main and auxiliary generators directly, no multiplier gearing being employed. By mounting the motor 40 within the container, only the comparatively low voltage leads for the motor protrude therefrom, and the seal between the power input and the container is further simplified.

It will of course be apparent that various changes and modifications may be introduced without departing from the spirit or scope of the invention. As an illustration, in some cases there is provided a main electrostatic generator having more than the two pairs of input and output electrodes employed in connection with the illustrated embodiments. In addition, the voltage regulating device may differ from that disclosed or in some cases may be omitted, particularly for applications in which a highly stable output voltage is not needed. Moreover, the manner in which power is applied to the rotors of the main and auxiliary generators may differ from the two forms shown, and in some situations the rotors may be driven magnetically from outside the sealed container. Still other changes will occur to those skilled in the art in the light of the foregoing disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An electrostatic generator unit comprising, in combination, a first electrostatic generator including input electrode means, output electrode means, and a first conveyor supported for movement between said input and output electrode means for conveying electric charges therebetween; a second electrostatic generator including a second conveyor operable to develop an exciting voltage; conductor means connected between said second electrostatic generator and said input electrode means for applying said exciting voltage to the input of said first electrostatic generator; power input means including a rotary shaft connected to both of said conveyors for driving the same, to produce a high output voltage at the output electrode means of said first electrostatic generator; and voltage regulator means connected to said output electrode means and also to said second electrostatic generator for varying the exciting voltage applied to said input electrode means in response to variations in said high output voltage.

2. An electrostatic generator unit comprising, in combination, a housing; a first electrostatic generator positioned within said housing, said first electrostatic generator including input electrode means, output electrode means, and a first rotor for receiving electric charges from said input electrode means and depositing said charges on said output electrode means; a second electrostatic generator positioned within said housing and including a second rotor rotatable with said first rotor for developing an exciting voltage; conductor means connected between said second electrostatic generator and said input electrode means for applying said exciting voltage to the input of said first electrostatic generator; power input means including a rotary shaft connected to both of said rotors for driving the same, to produce a high output voltage at the output electrode means of said first electrostatic generator; and voltage regulator means connected to said output electrode means and also to said second electrostatic generator for varying the exciting voltage applied to said input electrode means in response to variations in said high output voltage.

3. An electrostatic generator unit comprising, in combination, a hermetically sealed housing; a main electrostatic generator positioned within said housing, said main electrostatic generator including input electrode means, output electrode means, and a first conveyor supported for movement between said input and output electrode means for conveying electric charges therebetween; only a single auxiliary electrostatic generator positioned within said housing and including a second conveyor operable to develop an exciting voltage, said auxiliary electrostatic generator being of the self-priming and self-exciting type; conductor means disposed within said housing and connected between said auxiliary electrostatic generator and said input electrode means for applying said exciting voltage to the input of said main electrostatic generator; and only a single power input means extending into said housing in sealing relation therewith for operating both of said conveyors, to produce a high output voltage at the output electrode means of said main electrostatic generator without external priming leads extending into said housing.

4. An electrostatic generator unit comprising, in combination, a hermetically sealed housing; a body of pressurized gas having high dielectric rigidity within said housing; a main electrostatic generator in said housing, said main electrostatic generator including a main rotor, input electrode means associated with said main rotor for depositing electric charges thereon upon application of an exciting voltage to said input electrode means, and output electrode means associated with said main rotor for withdrawing charges therefrom; only a single auxiliary electrostatic generator within said housing and including an auxiliary rotor rotatable with said main rotor for developing an exciting voltage, said auxiliary electrostatic generator being of the self-priming and self-exciting type; conductor means disposed within said housing and connected between said auxiliary electrostatic generator and said input electrode means for applying said exciting voltage to the input of said main electrostatic generator; and only a single power input means extending into said housing for simultaneously rotating both of said rotors, to produce a high output voltage at the output electrode means of said main electrostatic generator without external priming leads extending into said housing.

5. An electrostatic generator unit comprising, in combination, a hermetically sealed housing; a body of pressurized gas having high dielectric rigidity within said housing; a main electrostatic generator in said housing, said main electrostatic generator including a main rotor, input electrode means associated with said main rotor for depositing electric charges thereon upon application of an exciting voltage to the said input electrode means, and output electrode means associated with said main rotor for withdrawing charges therefrom; only a single auxiliary electrostatic generator positioned within said housing and including an auxiliary rotor rotatable with said main rotor for developing an exciting voltage, said auxiliary electrostatic generator being of the self-priming and self-exciting type; conductor means disposed within said housing and connected between said auxiliary electrostatic generator and said input electrode means for applying said exciting voltage to the input of said main electrostatic generator; and only a single power input means extending into said housing for simultaneously rotating both of said rotors, said power input means including a rotary shaft extending into said housing in sealing relationship therewith and means for coupling said shaft with said rotors, to produce a high output voltage at the output electrode means of said main electrostatic generator without external priming leads extending into said housing.

6. An electrostatic generator unit of the character set forth in claim 5, said power input means including speed multiplier gearing operatively interposed within said housing between said shaft and said rotors, to drive said rotors at the same speed.

7. An electrostatic generator unit comprising, in combination, a hermetically sealed housing; a body of pressurized gas having high dielectric rigidity within said housing; a main electrostatic generator in said housing, said main electrostatic generator including a main rotor, input electrode means associated with said main rotor for depositing electric charges thereon upon application of an exciting voltage to said input electrode means, and output electrode means associated with said main rotor for withdrawing charges therefrom; only a single auxiliary electrostatic generator within said housing and including an auxiliary rotor rotatable with said main rotor for developing an exciting voltage, said auxiliary electrostatic generator being of the self-priming and self-exciting type; conductor means disposed within said housing and connected between said auxiliary electrostatic generator and said input electrode means for applying said exciting voltage to the input of said main electrostatic generator; and power input means including an electric motor within said housing for simultaneously rotating both of said rotors and only a single set of energizing leads extending into said housing for supplying current to said motor, to produce a high output voltage at the output electrode means of said main electrostatic generator without external priming leads extending into said housing.

8. An electrostatic generator unit comprising, in combination, a housing; a main electrostatic generator positioned within said housing, said main electrostatic generator including input electrode means, output electrode means, and a main rotor for receiving electric charges form said input electrode means and depositing said charges on said output electrode means; a self-exciting auxiliary electrostatic generator positioned within said housing and including an auxiliary rotor rotatable with said main rotor for developing an exciting voltage; conductor means connected between said auxiliary electrostatic generator and said input electrode means for applying said exciting voltage to the input of said main electrostatic generator; power input means for rotating both of said rotors, to produce a high output voltage at the output electrode means of said main electrostatic generator; and means including a voltage regulator supported within said housing, said voltage regulator being connected to said output electrode means and also to said auxiliary electrostatic generator to vary the exciting voltage applied to said input electrode means in response to variations in said high output voltage.

9. An electrostatic generator unit comprising, in combination, a hermetically sealed housing; a body of pressurized gas having high dielectric rigidity within said housing; a main electrostatic generator in said housing, said main electrostatic generator including input electrode means, output electrode means, and a main rotor supported for movement between said input and output electrode means for conveying electric charges therebetween; a self-exciting auxiliary electrostatic generator positioned within said housing and including an auxiliary rotor rotatable with said main rotor for developing an exciting voltage; conductor means connected between said auxiliary electrostatic generator and said input electrode means for applying said exciting voltage to the input of said main electrostatic generator; power input means including a rotary shaft in driving relation with both of said rotors for rotating the same, to produce a high output voltage at the output electrode means of said main electrostatic generator; and means including a voltage regulator supported within said housing, said voltage regulator being connected to said output electrode means and also to said auxiliary electrostatic generator to vary the exciting voltage applied to said input electrode means in response to variations in said high output voltage.

10. An electrostatic generator unit comprising, in combination, a hermetically sealed housing; a main electrostatic generator positioned within said housing, said main electrostatic generator including a rotor and a stator in spaced-apart relationship with each other, input electrode means associated with said rotor and stator for depositing electric charges on said rotor upon the application of an exciting voltage to said input electrode means, and output electrode means associated with said rotor and stator for withdrawing charges from said rotor; a self-priming and self-exciting auxiliary electrostatic generator positioned within said housing, said auxiliary electrostatic generator including a first rotatable pulley, a second rotatable pulley, a belt interconnecting said pulleys, and input and output electrodes closely spaced from the outer surface of the belt adjacent the respective pulleys for respectively depositing and withdrawing charges on and from the belt, to develop an exciting voltage at the output electrode; conductor means disposed within said housing and connecting the output electrode of the auxiliary electrostatic generator to the input electrode means of the main electrostatic generator for applying said exciting voltage thereto; an output terminal connected to the output electrode means of said main electrostatic generator; and only a single power input means extending into said housing for rotating said rotor and one of said pulleys, to produce a high output voltage at said output terminal without external priming leads extending into said housing.

11. An electrostatic generator unit comprising, in combination, a hermetically sealed container; a main electrostatic generator in the container including a rotor and a stator defining a uniform annular gap therebetween, input electrode means associated with said rotor and stator for depositing electric charges on said rotor upon the application of an exciting voltage to said input electrode means, and output electrode means associated with said rotor and stator for withdrawing charges from said rotor; only a single self-priming and self-exciting auxiliary electrostatic generator positioned within said container including a first rotatable pulley mechanically connected for rotation with said rotor, a second rotatable pulley, a belt interconnecting said pulleys, and input and output electrodes closely spaced from the outer surface of the belt adjacent the respective pulleys for respectively depositing and withdrawing charges on and from the belt, to develop an exciting voltage at the output electrode; conductor means disposed within said container and connecting the output electrode of the auxiliary electrostatic generator to the input electrode means of the main electrostatic generator for applying said exciting voltage thereto; an output terminal connected to the output electrode means of said main electrostatic generator and extending out of the container in sealing relation therewith; and only a single power input means extending into the container in sealing relation therewith for rotating said rotor and first pulley, to produce a high output voltage at said output terminal without external priming leads extending into said container.

12. An electrostatic generator unit comprising, in combination, a hermetically sealed housing; a main electrostatic generator positioned within said housing, said main electrostatic generator including a rotor and a stator defining a uniform annular gap therebetween, input electrode means associated with said rotor and stator for depositing electric charges on said rotor upon the application of an exciting voltage to said input electrode means, and output electrode means associated with said rotor and stator for withdrawing charges from said rotor; a self-priming and self-exciting auxiliary electrostatic generator in said housing including a first rotatable pulley mechanically connected for rotation with said rotor, a second rotatable pulley spaced from said first pulley, a belt interconnecting said pulleys, and input and output electrodes in juxtaposition with the outer surface of said belt adjacent the respective pulleys for respectively depositing and withdrawing charges on and from the belt, to develop an exciting voltage at the output electrode; conductor means disposed within said housing and connecting the output electrode of the auxiliary electrostatic generator to the input electrode means of the main electrostatic generator for applying said exciting voltage thereto; a high-voltage output terminal connected to the output electrode means of said main electrostatic generator and extending out of said housing in sealing relation therewith; only a single power input means extending into the housing in sealing relation therewith for rotating said rotor and said first pulley, to produce a high output voltage at said output terminal without external priming leads extending into said housing; and a body of pressurized gas having a relatively high dielectric strength disposed within said housing for increasing the electrostatic field in said annular gap and in the space surrounding said belt.

13. An electrostatic generator unit comprising, in combination, a hermetically sealed container; a main electrostatic generator positioned within said container, said main electrostatic generator inclduing a rotor and a stator defining a uniform annular gap therebetween, input electrode means cooperating with said rotor and stator for depositing electric charges on said rotor upon the application of an exciting voltage to said input electrode means, and output electrode means cooperating with said rotor and stator for withdrawing charges from said rotor; a self-exciting auxiliary electrostatic generator in the container including a first rotatable pulley, a second rotatable pulley, a belt interconnecting said pulleys, and input and output electrodes closely spaced from the outer surface of the belt adjacent the respective pulleys for respectively depositing and withdrawing charges on and from the belt; conductor means connecting the output electrode of the auxiliary electrostatic generator to the input electrode means of the main electrostatic generator for applying said exciting voltage thereto; power input means extending into the container in sealing relation therewith for rotating said rotor and one of said pulleys, to produce a high output voltage at the output electrode means of said main electrostatic generator; a body of pressurized gas having a relatively high dielectric strength disposed within said container for increasing the electrostatic field in said annular gap and in the space surrounding said belt; and voltage regulator means supported within said container for varying the exciting voltage applied to said input electrode means in response to variations in said high output voltage, said voltage regulator means being connected to said output electrode means and also to said input electrode means.

14. An electrostatic generator unit comprising, in combination, a hermetically sealed container; a main electrostatic generator positioned within said container, said main electrostatic generator including a rotor and a stator defining a uniform annular gap therebetween, input electrode means cooperating with said rotor and stator for depositing electric charges on said rotor upon the application of an exciting voltage to said input electrode means, and output electrode means cooperating with said rotor and stator for withdrawing charges from said rotor; a self-exciting auxiliary electrostatic generator in the container including a first rotatable pulley mechanically connected for rotation with said rotor, a second rotatable pulley, a belt interconnecting said pulleys, and input and output electrodes closely spaced from the outer surface of the belt adjacent the respective pulleys for respectively depositing and withdrawing charges on and from the belt; conductor means connecting the output electrode of the auxiliary electrostatic generator to the input electrode means of the main electrostatic generator for applying said exciting voltage thereto; a high-voltage output terminal connected to the output electrode means of said main electrostatic generator and extending out of the container in sealing relation therewith; power input means extending into the container in sealing relation therewith for rotating said rotor and said first pulley, to produce a high output voltage at said output electrode means and hence at said high-voltage output terminal, said power input means including a rotary shaft extending into said container and mechanically coupled to said rotor and to said first pulley; a body of pressurized gas having a relatively high dielectric strength disposed wtihin said container for increasing the electrostatic field in said annular gap and in the space surrounding said belt; and voltage regulator means supported within said container for varying the exciting voltage applied to said input electrode means in repsonse to variations in said high output voltage, said voltage regulator means being connected to said output electrode means and also to said auxiliary electrostatic generator.

15. An electrostatic generator unit comprising, in combination, a hermetically sealed container of generally cylindrical configuration; a main electrostatic generator positioned within said container; said main electrostatic generator including a rotor and a stator defining a uniform annular gap therebetween, input electrode means associated with said rotor and stator for depositing electric charges on said rotor upon the application of an exciting voltage to said input electrode means, and output electrode means associated with said rotor and stator for withdrawing charges from said rotor; a self-exciting auxiliary electrostatic generator in the container including a first rotatable pulley mechanically connected for rotation with said rotor, a second rotatable pulley, a belt interconnecting said pulleys, and input and output electrodes closely spaced from the outer surface of the belt adjacent the respective pulleys for respectively depositing and withdrawing charges on and from the belt; conductor means connecting the output electrode of the auxiliary electrostatic generator to the input electrode means of the main electrostatic generator for applying said exciting voltage thereto; a high-voltage output terminal connected to the output electrode means of the main generator and extending out of the container in sealing relation therewith; power input means extending into the container in sealing relation therewith for rotating said rotor and said first pulley, to produce a high output voltage at said output electrode means and hence at said high-voltage output terminal, said power input means including an electric motor sealed within said container and conductor means extending into the container for supplying power to said motor; and a body of pressurized gas having a relatively high dielectric strength disposed within said container for increasing the electrostatic field in said annular gap and in the space surrounding said belt; and voltage regulator means supported within said container for varying the exciting voltage applied to said input electrode means in response to variations in said high output voltage, said voltage regulator means being connected to said output electrode means and also to said auxiliary electrostatic generator.

16. An electrostatic generator unit comprising, in combination, a generally cylindrical hermetically sealed container; a main eletcrostatic generator in said container including a cylindrical rotor and a cylindrical stator both coaxial with the container and defining an annular gap between the rotor and stator, both said rotor and said stator being fabricated from dielectric material, input electrodes including a first ionizer electrode and a first inductor electrode associated with said rotor and said stator for depositing charges on the rotor, and output electrodes including a second ionizer electrode and a second inductor electrode associated with said rotor and said stator for withdrawing charges from the rotor; a self-priming and self-exciting auxiliary electrostatic generator in said container including a first pulley coaxial with and rotatable with said rotor, a second rotatable pulley, an insulating belt interconnecting said pulleys, and additional input and output ionizing electrodes closely spaced from the outer belt surface adjacent the respective pulleys for respectively depositing and withdrawing charges on and from said belt; a conductor disposed within said container and connecting the auxiliary generator output electrode to the input electrode of the main generator for applying an exciting voltage thereto; a high-voltage output terminal connected to the output electrode of the main generator and extending out of the container through one end wall thereof in insulated sealing relation therewith; only a single power input means extending into the container from the opposite end wall thereof in sealing relation therewith and including a drive shaft in the container extending axially thereof and coaxially coupled with said first pulley and said rotor, to produce a high output voltage at said high-voltage output terminal without external priming leads extending into said container; and a body of pressurized gas having relatively high dielectric strength within said container.

References Cited

UNITED STATES PATENTS

| 2,702,869 | 2/1955 | Felici | 310—6 |
| 2,840,729 | 6/1958 | Kreuthmeir | 310—6 |
| 2,860,264 | 11/1958 | Felici | 310—6 |

FOREIGN PATENTS

| 201,457 | 9/1955 | Australia. |
| 1,077,314 | 3/1960 | Germany. |

MILTON O. HIRSHFIELD, *Primary Examiner.*

J. W. GIBBS, *Assistant Examiner.*